(12) United States Patent
Momoze

(10) Patent No.: US 6,398,327 B1
(45) Date of Patent: Jun. 4, 2002

(54) MAGAZINE INSERTION SLOT OPENING/CLOSING DEVICE

(75) Inventor: Hiroshi Momoze, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

(21) Appl. No.: 09/616,513

(22) Filed: Jul. 14, 2000

(30) Foreign Application Priority Data

Jul. 15, 1999 (JP) ............................................ 11-201381

(51) Int. Cl.[7] .............................................. A47B 88/00
(52) U.S. Cl. ........................ 312/319.1; 49/362; 312/333
(58) Field of Search .......................... 312/330.1, 223.1, 312/319.1, 333, 223.7, 298, 310, 413; 49/30, 212, 362

(56) References Cited

U.S. PATENT DOCUMENTS 5,924,780 A * 7/1999 Ammon et al. .......... 312/223.2
6,216,494 B1 * 4/2001 Apprich ...................... 49/212

* cited by examiner

Primary Examiner—Peter M. Cuomo
Assistant Examiner—Jerry A. Anderson
(74) Attorney, Agent, or Firm—Price and Gess

(57) ABSTRACT

A magazine insertion slot opening/closing device is able to automatically close a slide door after being opened. The front side of a magazine insertion slot formed in a decorative panel is covered by an outer door and an inner door. Both the doors are coupled to each other through first and second door plates, a gear damper and a rack plate. With this coupling structure, when one of the outer door and the inner door is moved, the other is also moved in the same direction in an interlocked manner. A locking link is urged by a lock spring in the locking direction to lock the doors in the open state through the first door plate. When closing the doors, the locking link is operated to release the doors from the locked state by rotating a cam gear with rotation of a motor or manually moving the outer door to some extent in the closing direction, whereby the doors are closed under a urging force of a door spring.

14 Claims, 14 Drawing Sheets

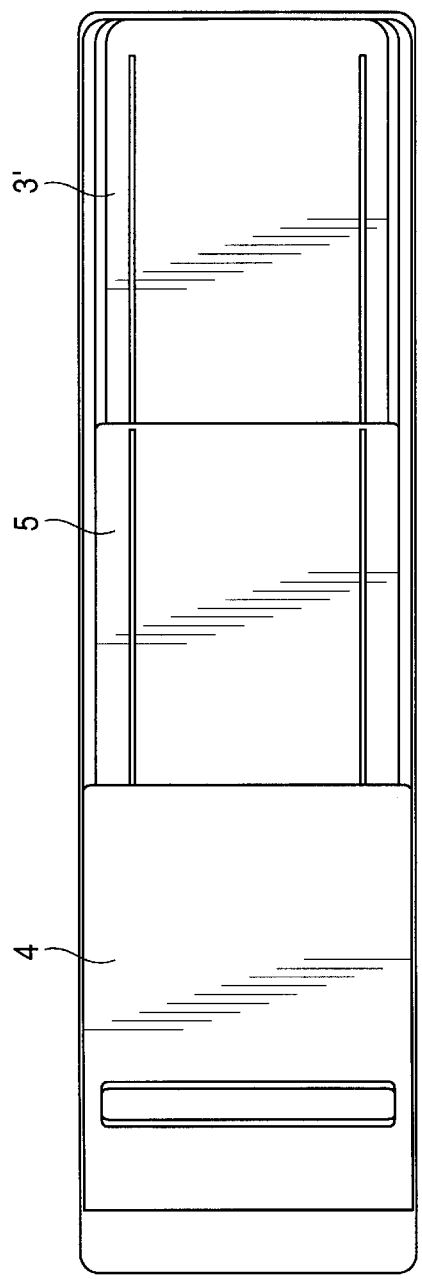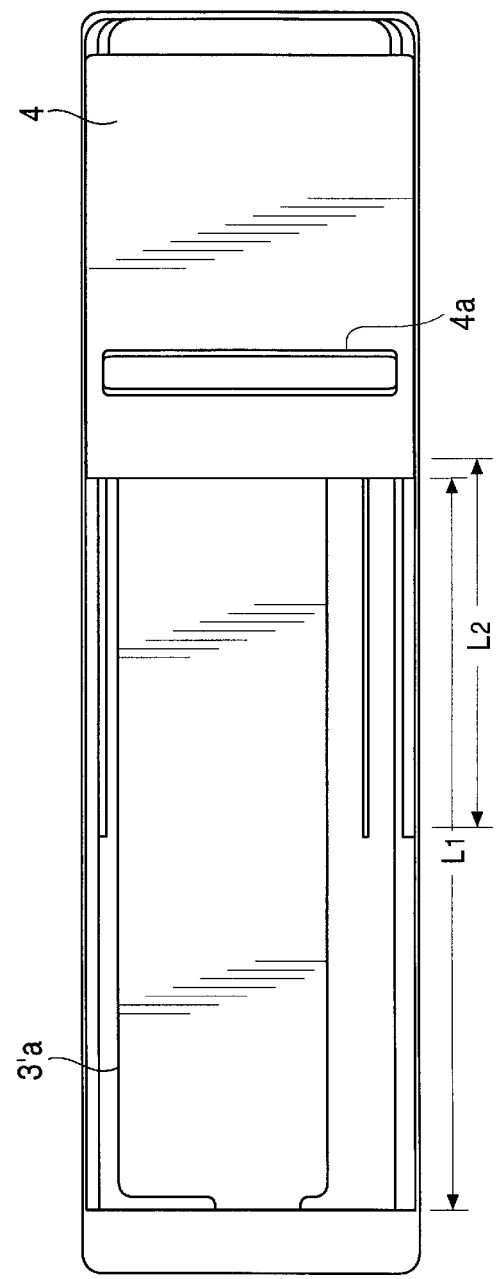

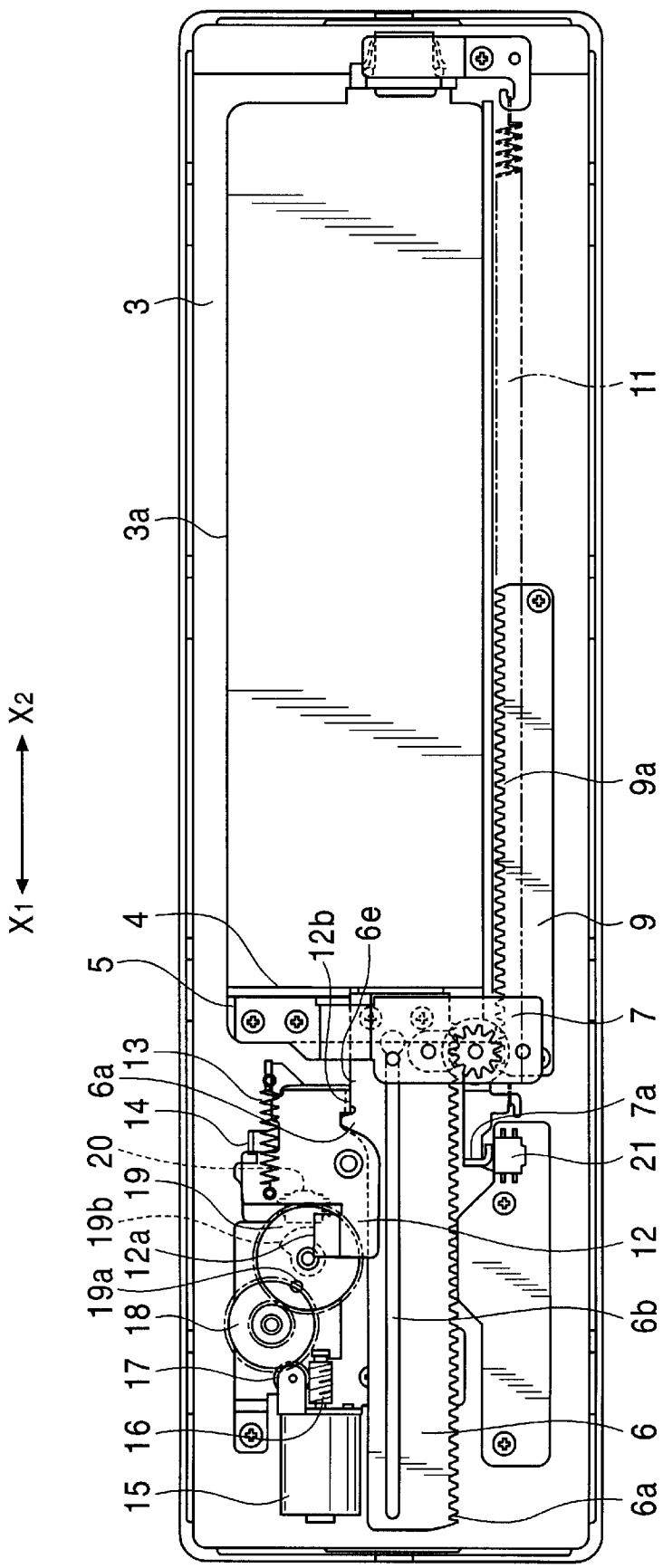

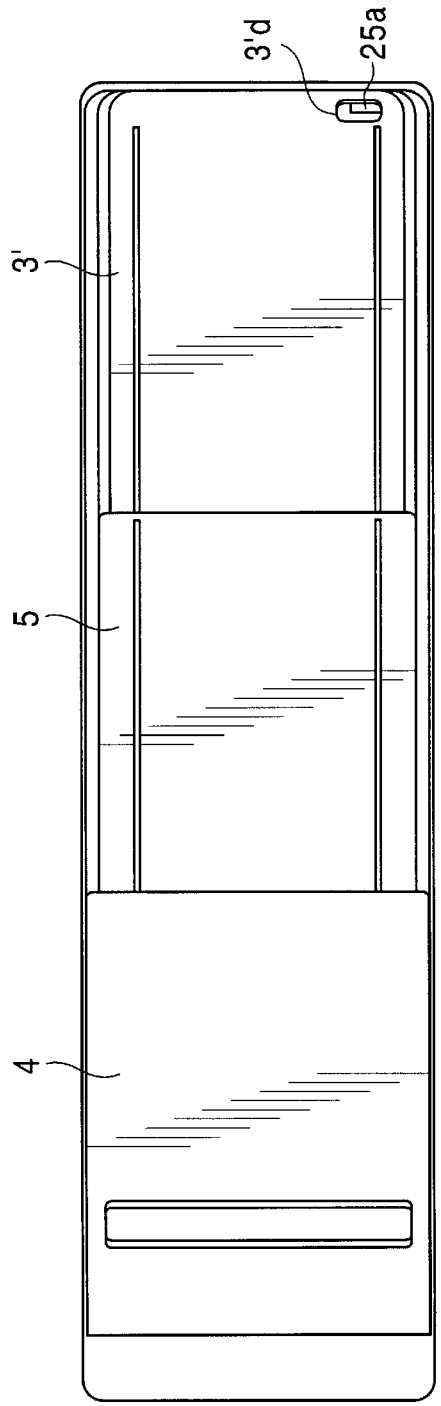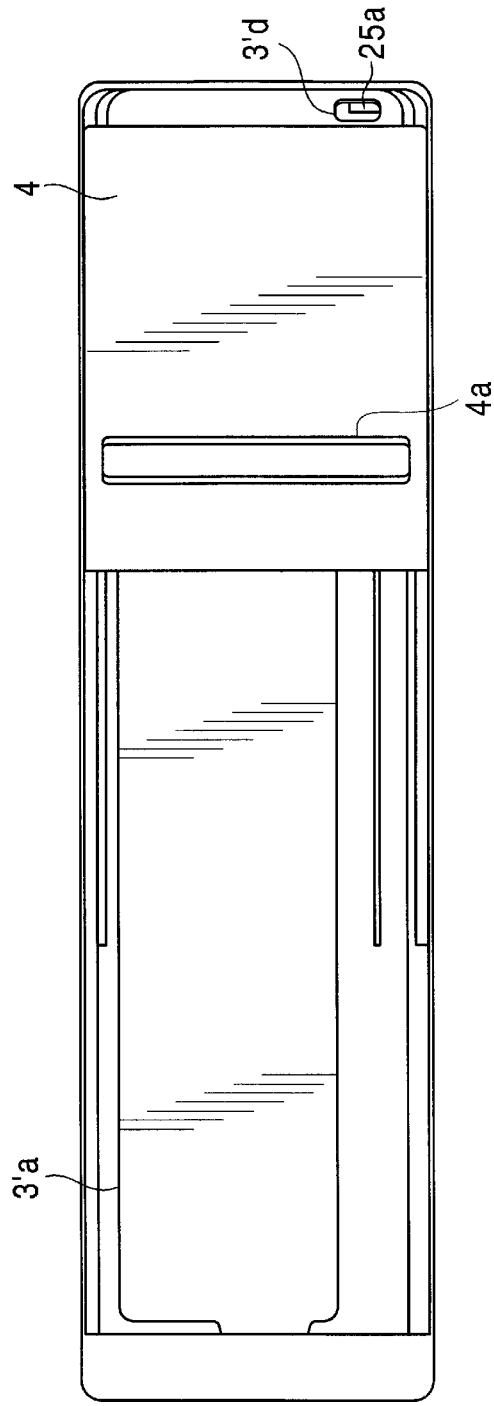

MAGAZINE INSERTION SLOT OPENING/CLOSING DEVICE

BACKGROUND OF THE INVENTION

1. Field of the Invention

The present invention relates to a magazine insertion slot opening/closing device for opening and closing a magazine insertion slot provided in a magazine type changer unit such as a CD changer.

2. Description of the Related Art

In an autochanger unit of the type using a magazine which contains discs, a magazine insertion slot is provided to allow insertion and ejection of the magazine therethrough, and a door is provided so as to cover the magazine insertion slot. When such a magazine type autochanger unit is mounted on a vehicle, etc., a slide-type door rather than a swingable door is employed in many cases because the space available for operation of the door is restricted. Conventionally, the slide door has been manually opened and closed using a knob or the like provided on the surface of the slide door.

Use of the manually operated slide door to cover the magazine insertion slot, however, poses a problem in that the slide door may be left open after it has been opened for insertion or ejection of a magazine. If the slide door is left open, there is a risk that various foreign matters ranging from small substances such as dust to relatively large substances such as pieces of paper and coins may enter the changer unit through the open magazine insertion slot, and they may impede the operation of the changer unit. Also, even when the slide door is slid in the closing direction, the slide door often fails to be slid to its fully closed position. In such a case, a part of the magazine insertion slot is left open, thus likewise resulting in a possibility that foreign matters may enter the changer unit.

SUMMARY OF THE INVENTION

The present invention has been proposed to solve the above-mentioned problems in the related art, and an object of the invention is to provide a magazine insertion slot opening/closing device which is able to automatically close a slide door after being opened.

To achieve the above object, according to the present invention, in a magazine insertion slot opening/closing device for opening and closing a magazine insertion slot provided in a magazine type changer unit, a slide door is automatically closed by an urging unit.

In accordance with a first aspect of the present invention, there is provided a magazine insertion slot opening/closing device for opening and closing a magazine insertion slot provided in a magazine type changer unit, the device comprising: a slide door slidably supported by a body of the changer unit to open and close the magazine insertion slot; door urging means for urging the slide door in a closing direction; a lock mechanism for locking the slide door in an open state; and an unlock mechanism for releasing the slide door locked by the lock mechanism.

With the above construction, when a magazine is inserted in and ejected from the changer unit, the slide door can be locked in the open state by the lock mechanism after the slide door has been opened. Then, the slide door can be surely released from the lock mechanism by automatically actuating the unlock mechanism at the time the insertion or ejection of the magazine is completed or ceased. After the unlocking, the slide door can be automatically closed under an urging force of the door urging unit with certainty.

Preferably, the locking and unlocking mechanisms are constructed as follows. The lock mechanism includes a locking member for locking the slide door and lock urging means for urging the locking member in a locking direction, the locking member being first pushed back in an unlocking direction with movement of the slide door in an opening direction and then moved in the locking direction to lock the slide door with further movement of the slide door in the opening direction. The unlock mechanism includes a release member for driving the locking member in the unlocking direction and driving force supply means for applying a driving force to the release member, the driving force supply means applying the driving force to the release member under electrical control, causing the release member to release the slide door locked by the lock mechanism.

With these features, when the slide door is opened, the slide door can be surely locked in a predetermined open position by utilizing movement of the slide door in the opening direction in a mechanical manner. When insertion of ejection of the magazine is completed, the slide door can be surely released from the lock mechanism by actuating the unlock mechanism under electrical control using various detection signals, etc. In this connection, the unlocked slide door can be automatically closed by the door urging unit with certainty.

The arrangement may be such that the unlock mechanism releases the slide door locked by the lock mechanism when a magazine is inserted into the body of the autochanger unit and locked in a predetermined setup position.

With this arrangement, it is possible to automatically close the slide door upon completion of insertion of the magazine. In general this can easily be implemented by arranging such that the unlock mechanism is activated by a signal produced by a magazine lock detection switch or the like that detects locking of the magazine at the predetermined setup position.

The arrangement may be such that the unlock mechanism releases the slide door locked by the lock mechanism when a preset certain time has lapsed after opening of the slide door in a condition where no magazine is inserted in the body of the autochanger unit.

This feature offers the following advantage. In the event that the slide door has accidentally been left opened as, for example, the user has suspended the magazine insertion operation after opening the slide door, the slide door can automatically be closed without allowing the slide door to be kept opened for a long time. This operation can easily be implemented by arranging such that the unlock mechanism is activated by signals produced by the aforesaid magazine lock detection switch and a slide door open detection switch, together with a signal from a timer.

The arrangement further may be such that the unlock mechanism releases the slide door locked by the lock mechanism when a magazine is ejected from the body of the autochanger unit and extracted to the outside through the magazine insertion slot.

This arrangement permits the slide door to be automatically closed when the magazine has been fully extracted after being ejected. In general, this operation can easily be implemented by activating the unlock mechanism by a signal produced by, for example, a magazine IN/OUT detection switch capable of detecting that the magazine has been inserted into the magazine insertion slot.

The arrangement further may be such that the slide door comprises a plurality of slide doors which are divided in a sliding direction and slidable along respective inner and outer paths, and interlock means is provided between adjacent two of the divided slide doors for moving the other slide door at a preset ratio with movement of one slide door in an interlocked manner.

With this feature, the size of each of the divided slide doors can be reduced, and the divided slide doors can be positioned in overlapped relation, when opened, by properly setting a ratio between strokes through which the individual slide doors are movable. Accordingly, a space necessary for operating the slide door entirely can be minimized and the slide door can be avoided from projecting undesirably when opened.

In accordance with a aspect of the present invention, a magazine insertion slot opening/closing device comprises a slide door slidably supported by a body of a changer unit to open and close a magazine insertion slot, and a door urging unit for urging the slide door in a closing direction. Also, the device comprises a lock mechanism for locking the slide door in an open state, an unlock mechanism for releasing the slide door locked by the lock mechanism, and a manual unlocking unit capable of manually releasing the slide door locked by the lock mechanism separately from the unlock mechanism.

With the above construction, when a magazine is inserted in and ejected from the changer unit, the slide door can be locked in the open state by the lock mechanism after the slide door has been opened. Then, the slide door can be surely released from the lock mechanism by automatically actuating the unlock mechanism or by manual operation at the time the insertion or ejection of the magazine is completed or ceased. Further, after being unlocked, the slide door can be automatically closed under an urging force of the door urging unit with certainty.

Preferably, the lock mechanism, the unlock mechanism, and the manual unlocking unit are constructed as follows. The lock mechanism includes a locking member for locking the slide door and a lock urging unit for urging the locking member in a locking direction. The locking member is first pushed back in an unlocking direction accompanying a movement of the slide door in an opening direction and then moved in the locking direction to lock the slide door with further movement of the slide door in the opening direction. Also, the unlock mechanism includes a release member for driving the locking member in the unlocking direction and a driving force supply unit for applying a driving force to the release member. The driving force supply unit applies the driving force to the release member under electrical control, causing the release member to release the slide door locked by the lock mechanism. Further, the manual unlocking unit generates a force of pushing back the locking member in the unlocking direction when an external force greater than a certain level is applied.

With these features, when the slide door is opened, the slide door can be surely locked in a predetermined open position by utilizing movement of the slide door in the opening direction in a mechanical manner. When the slide door is closed from the condition being locked in the predetermined open position, the slide door can be surely released from the lock mechanism by actuating the unlock mechanism under electrical control using various detection signals, etc., or by manually operating the manual unlocking unit. In this connection, the unlocked slide door can be automatically closed by the door urging unit with certainty.

In this magazine insertion slot opening/closing device preferably, the manual unlocking unit is constituted by an engagement portion provided on one of the slide door and the locking member to locate therebetween, the engagement portion generating the force of pushing back the locking member in the unlocking direction when an external force greater than a certain level is applied to the slide door in the closing direction.

With the above construction, the slide door can be easily released from the locked state by manual operation. More specifically, when the slide door is closed from the condition being locked in the predetermined open position, the locking member is pushed back to an unlock position by the engagement portion by slightly applying a force of moving the slide door in the closing direction, thus enabling the slide door to be easily released from the locked state by manual operation. Further, since the manual unlocking unit can be simply constructed by the engagement portion provided on one of the slide door and the locking member to locate therebetween, there is no need of providing, for example, an additional member dedicated for the manual unlocking.

In this magazine insertion slot opening/closing device, preferably, the engagement portion includes a guide-side slope and a locked-side slope which are sloped in different directions. The guide-side slope acts to generate a force of pushing back the locking member in the unlocking direction upon application of a force of moving the slide door in the opening direction, and the locked-side slope acts to generate a force of pushing back the locking member in the unlocking direction upon application of a force of moving the slide door in the closing direction. Further, the lock urging unit generates a urging force set such that a force acting to hold the locking member in a predetermined lock position under the urging force generated by the lock urging unit is greater than a force acting to push back the locking member in the unlocking direction under the urging force generated by the door urging unit.

With this feature, by utilizing the simple engagement portion including the two slopes and properly setting the relationship between the urging forces of both the urging units, a series of locking operations can be easily and reliably performed when the slide door is opened, and the slide door can be easily and reliably unlocked when the slide door is closed. More specifically, when the slide door is opened, the locking member is pushed back in the unlocking direction by the guide-side slope upon application of the force of moving the slide door in the opening direction. Then, the slide door is locked at the locked-side slope by the locking member under the urging force of the lock urging unit. On this occasion, a force of pushing back the locking member in the unlocking direction is exerted on the locked-side slope due to the urging force of the lock urging unit. However, since the force acting to hold the locking member in the predetermined lock position under the urging force of the lock urging unit is greater than the above pushing-back force, the locking member can be surely held in the lock position, and therefore the slide door can be surely locked in the predetermined open position. When the slide door is closed from the locked open state, the locking,member is pushed back by the locked-side slope to the unlock position by slightly applying a force of moving the slide door in the closing direction. As a result, the slide door can be easily released from the locked state.

In this magazine insertion slot opening/closing device, preferably, the manual unlocking unit is constituted by a rotatable manual release member having an engaging end held in engagement with the locking member and an operated end operable from the outside of the device, the manual release member being rotated to push back the locking member in the unlocking direction when an external force greater than a certain level is applied.

With this feature, the slide door can be manually and easily released from the locked state. More specifically, when the slide door is closed from the condition being locked in the predetermined open position, the manual release member is rotated by manually operating the operated end of the manual release member from the outside of the device. With the rotation of the manual release member, the locking member is pushed back in the unlocking direction by the engaging end of the manual release member, thus enabling the slide door to be manually and easily released from the locked state.

The arrangement may be such that the unlock mechanism releases the slide door locked by the lock mechanism when a magazine is inserted into the body of the autochanger unit and locked in a predetermined setup position.

With this feature, the slide door can be automatically closed after insertion of the magazine is completed. In general, this automatic closing operation can be easily realized by actuating the unlock mechanism with, e.g., a magazine-lock sensor switch for detecting the fact that the magazine has been locked in the predetermined setup position.

The arrangement also may be such that the unlock mechanism releases the slide door locked by the lock mechanism when a preset certain time has lapsed after opening of the slide door in a condition where no magazine is inserted in the body of the autochanger unit.

With this feature, when the slide door is accidentally left in the open state for such a reason that the user ceases the operation of inserting the magazine after opening the slide door for insertion of the magazine, the slide door can be automatically closed before a long time lapses in the condition of the slide door being left open. In general, this automatic closing operation can be easily realized by actuating the unlock mechanism using the magazine-lock sensor switch, an opening sensor switch for detecting the open state of the slide door, etc. in combination with a timer.

The arrangement may be such that the unlock mechanism releases the slide door locked by the lock mechanism when a magazine is ejected from the body of the autochanger unit and withdrawn to the outside through the magazine insertion slot.

With this feature, when the magazine is ejected from the changer unit, the slide door can be automatically closed after the magazine has been completely withdrawn to the outside. In general, this automatic closing operation can be easily realized by actuating the unlock mechanism using, e.g., a magazine IN/OUT sensor switch for detecting whether the magazine has been inserted into the magazine insertion slot.

The slide door may comprise a plurality of slide doors which are divided in a sliding direction and slidable along respective inner and outer paths, and an interlock unit is provided between adjacent two of the divided slide doors for moving the other slide door at a preset ratio with movement of one slide door in an interlocked manner.

With this feature, the size of each of the divided slide doors can be reduced, and the divided slide doors can be positioned in overlapped relation, when opened, by properly setting a ratio between strokes through which the individual slide doors are movable. Accordingly, a space necessary for operating the slide door entirely can be minimized and the slide door can be avoided from projecting undesirably when opened.

The above and other objects, features, and advantages of the present invention will become clear from the following description of the preferred embodiment when the same is read in conjunction with the accompanying drawings.

BRIEF DESCRIPTION OF THE DRAWINGS

FIGS. 3A and 3B are front views showing the decorative panel 3, the outer door 4 and the inner door 5 in the magazine insertion slot opening/closing device of FIG. 1, FIG. 3A showing the closed state and FIG. 3B showing the open state;

FIG. 8 is a rear view showing the magazine insertion slot opening/closing device of FIG. 1 in the open state;

FIGS. 10A and 10B are front views showing a decorative panel 3', an outer door 4 and an inner door 5 in a magazine insertion slot opening/closing device according to a second embodiment of the present invention, FIG. 10A showing the closed state and FIG. 10B showing the open state;

DESCRIPTION OF THE PREFERRED EMBODIMENTS

Embodiments of a magazine insertion slot opening/closing device, to which the present invention is applied, will be described below in detail with reference to the drawings.

(A) First Embodiment

[1. Construction]

Figure 1:
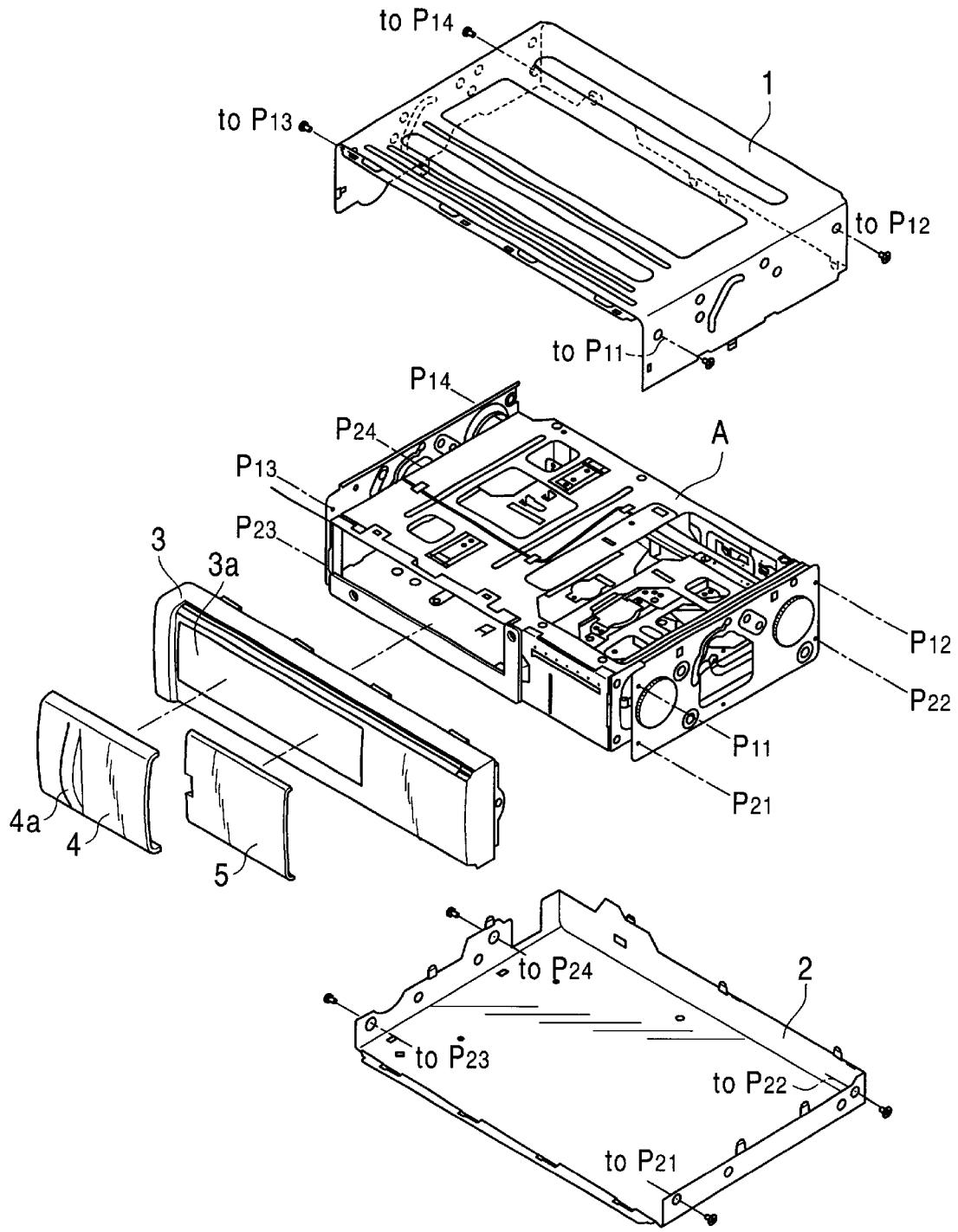
FIG. 1 is an exploded perspective view showing the entirety of an autochanger unit including a magazine insertion slot opening/closing device according to a first embodiment of the present invention.

FIG. 1 is an exploded perspective view showing the entirety of an autochanger unit including a magazine insertion slot opening/closing device according to a first embodiment. As shown in FIG. 1, an autochanger mechanism A is covered by an upper case 1, a lower case 2, and a decorative panel 3 positioned at the front. The decorative panel 3 has a magazine insertion slot 3a formed therein to allow insertion and ejection of a magazine through it. An opening of the magazine insertion slot 3a is covered by an outer door 4 and an inner door 5. An arc-shaped projecting knob 4a is provided on the surface of the outer door 4.

In FIG. 1, $P_{11}$–$P_{14}$ denote upper-case attachment points of the autochanger mechanism A, and $P_{21}$–$P_{24}$ denote lower-case attachment points of the autochanger mechanism A.

Figure 2:
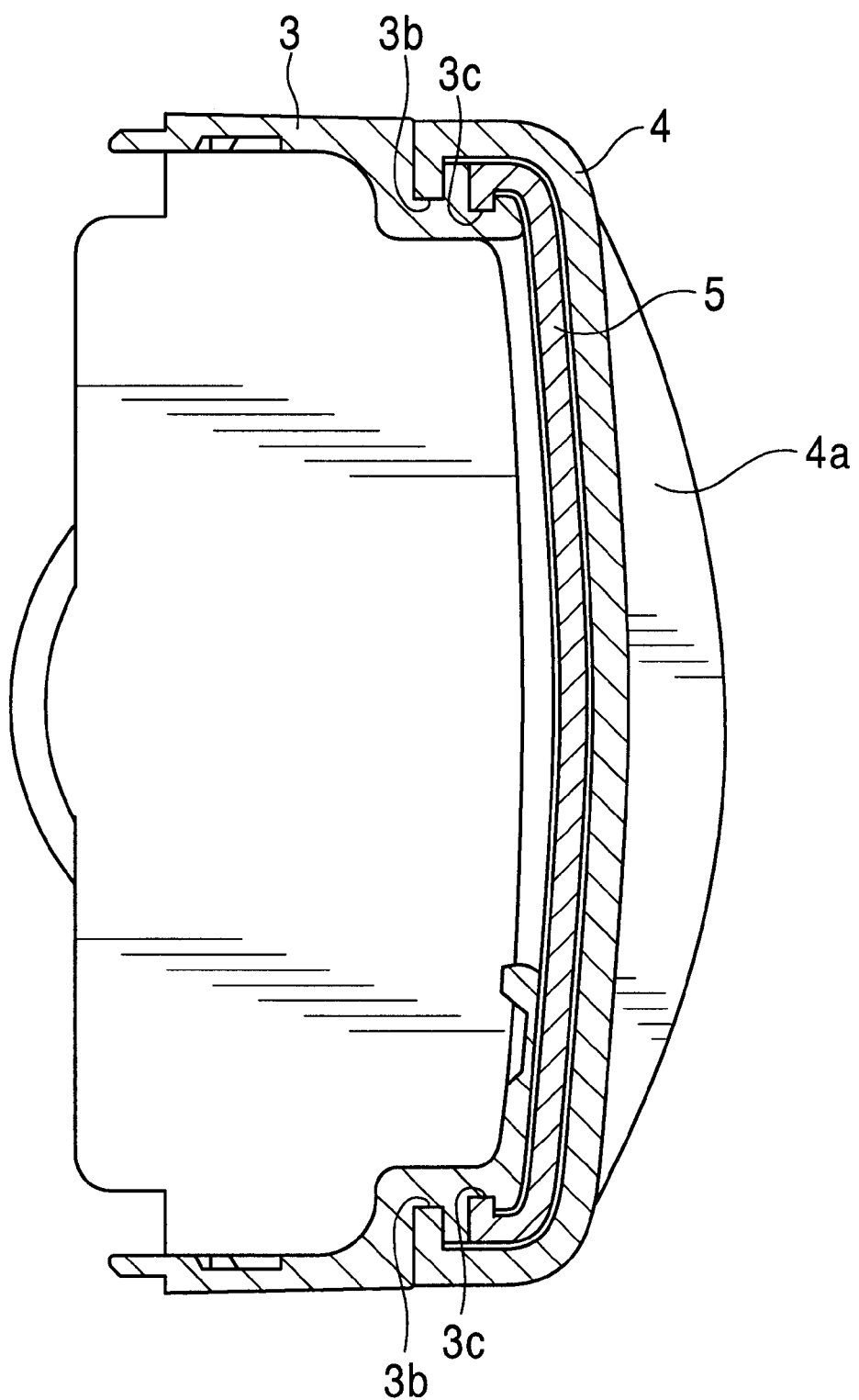
FIG. 2 is a vertical sectional view showing a decorative panel 3, an outer door 4 and an inner door 5 in the magazine insertion slot opening/closing device of FIG. 1.

FIG. 2 is a vertical sectional view showing the decorative panel 3, the outer door 4 and the inner door 5 in the magazine insertion slot opening/closing device according to the first embodiment, and FIGS. 3A and 3B are front views showing respectively the closed state and the open state of both the doors 4, 5. As shown in FIG. 2, the outer door 4 is slidably fitted to a pair of rail grooves 3b formed in upper and lower portions of the decorative panel 3, whereas the inner door 5 is slidably fitted to another pair of rail grooves 3c formed in the upper and lower portions of the decorative panel 3 outwardly of the rail grooves 3b. These doors 4, 5 can be operated to slide, as shown in FIGS. 3A and 3B, between the state of FIG. 3A in which the doors 4, 5 are positioned side by side in the left and right direction to close the magazine insertion slot 3a of the decorative panel 3, and the state of FIG. 3B in which the doors 4, 5 are positioned in depthwise overlapped relation to make open the magazine insertion slot 3a.

Figure 4:
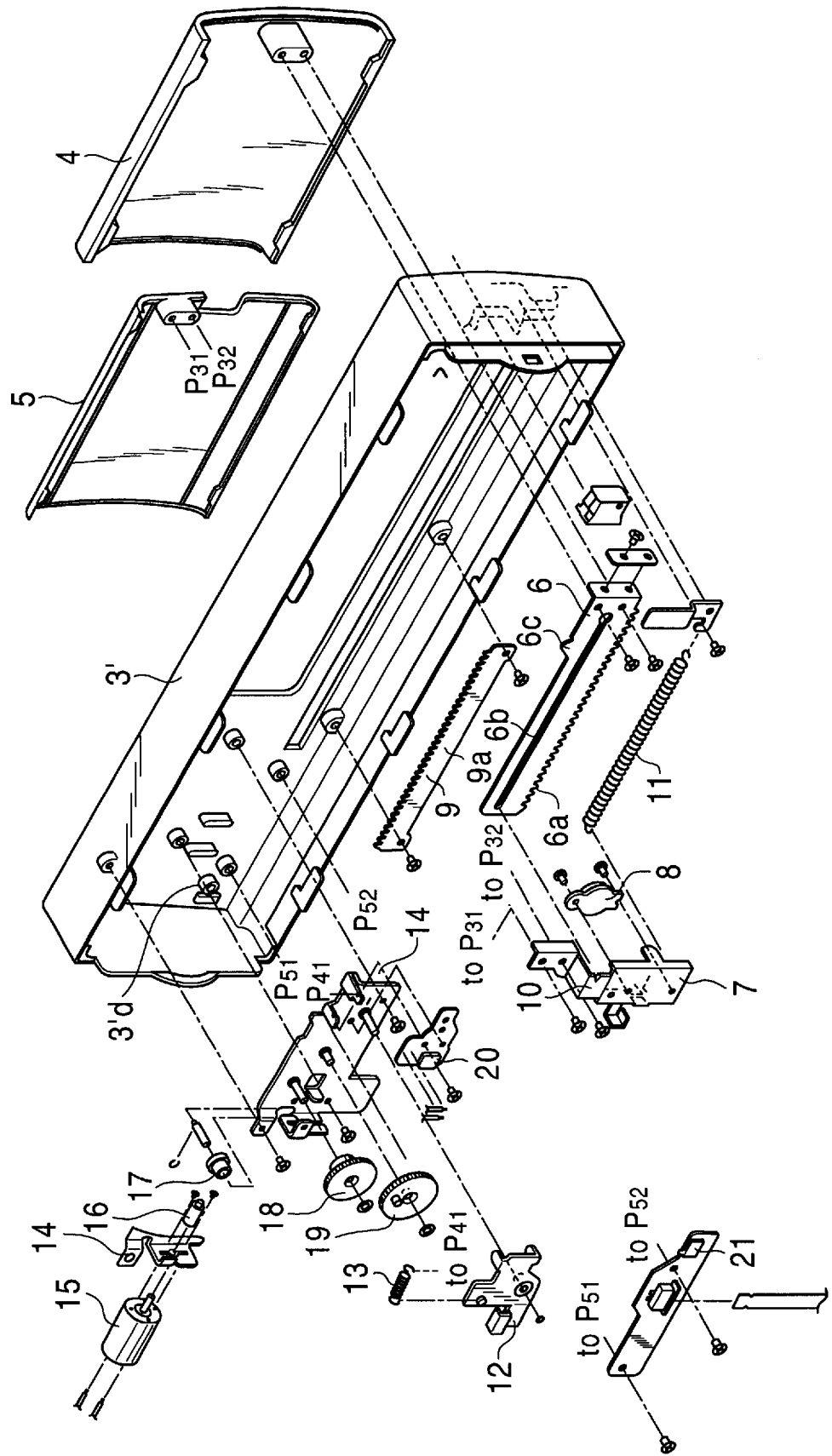
FIG. 4 is an exploded perspective view of the magazine insertion slot opening/closing device of FIG. 1 as viewed from the rear side.

FIG. 4 is an exploded perspective view of the magazine insertion slot opening/closing device according to the first embodiment as viewed from the rear side. A first door plate 6 extending in the horizontal direction is attached to the outer door 4, and a second door plate 7 being smaller than the first door plate 6 and extending in the vertical direction is attached to the inner door 5. In FIG. 4, $P_{31}$ and $P_{32}$ denote door-plate attachment points of the inner door 5. Further, a gear damper 8 is attached to the second door plate 7 at a position under the first door plate 6, and a rack plate 9 extending in the horizontal direction is attached to the decorative panel 3 at a position under the gear damper 8.

A rack 9a is provided at an upper end of the rack plate 9, and a rack 6a is provided at a lower end of the first door plate 6 in facing relation to the rack 9a of the rack plate 9. These racks 6a, 9a are meshed with the gear damper 8 from above and below, respectively. An elongate hole 6b extending in the horizontal direction is formed in an upper portion of the first door plate 6, and a pin 10 attached to the second door plate 7 is inserted in the elongate hole 6b. Further, a locked projection (engagement portion) 6c is provided at an upper end of the first door plate 6.

Figure 5:
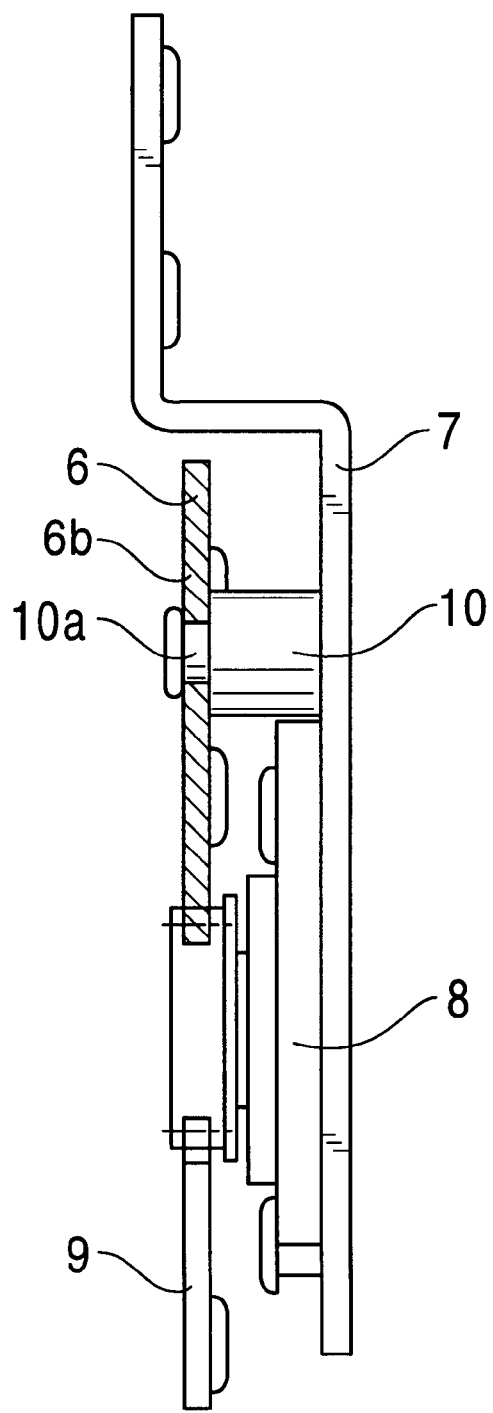
FIG. 5 is a side view showing the positional relationship among the doors 4, 5, door plates 6, 7, a gear damper 8 and a rack plate 9 shown in FIG. 4.

FIG. 5 is a side view showing the positional relationship among the doors 4, 5, the door plates 6, 7, the gear damper 8 and the rack plate 9. As shown in FIG. 5, a groove 10a is formed at a fore end of the pin 10 attached to the second door plate 7, and the groove 10a of the pin 10 is fitted to the elongate hole 6b of the first door plate 6 so that the pin 10 is slidable along the elongate hole 6b. With the structure interconnecting the doors 4 and 5 using the first and second door plates 6, 7, the gear damper 8 and the rack plate 9, as shown in FIGS. 4 and 5, when one of the outer door 4 and the inner door 5 is moved, the other door is also moved in the same direction in an interlocked manner. In this connection, as shown in FIG. 3B, the stroke $L_2$ through which the inner door 5 is movable is set to ½ of the stroke $L_1$ through which the outer door 4 is movable.

Figure 6:
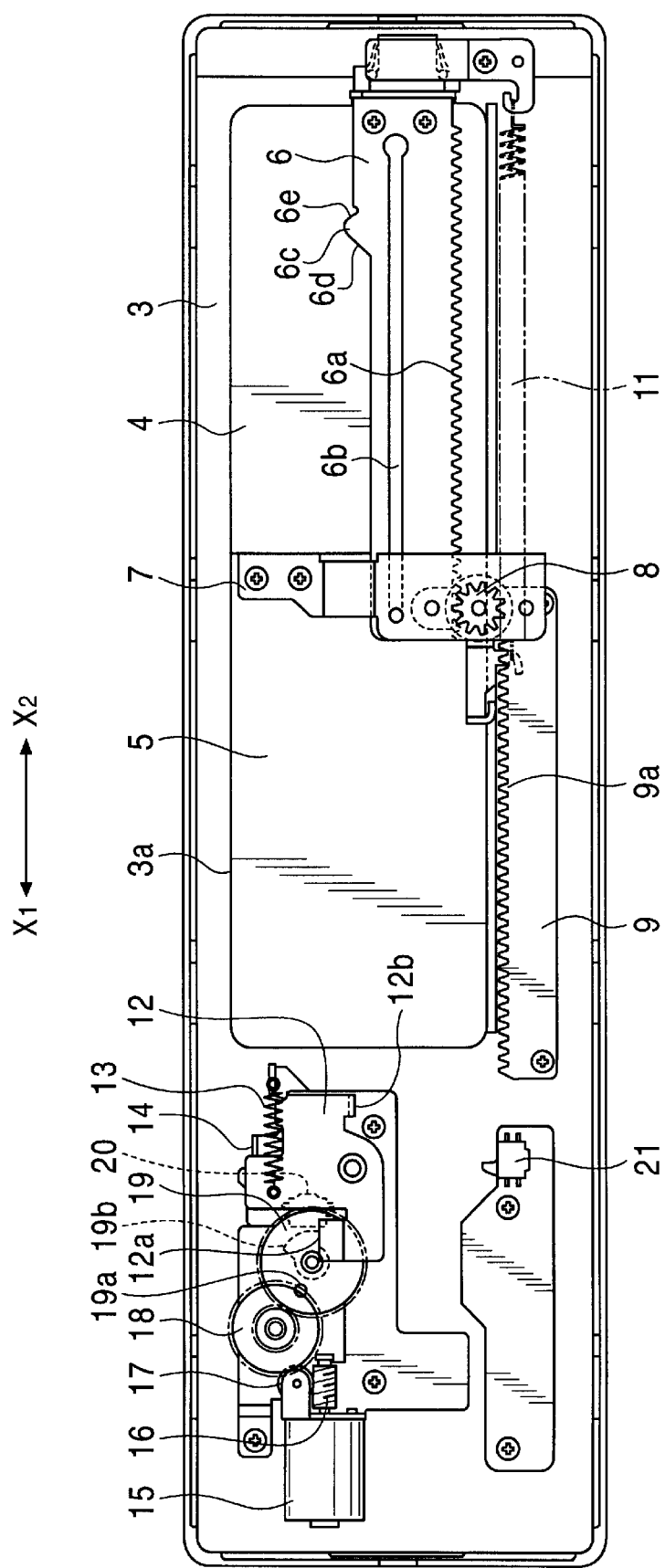
FIG. 6 is a rear view showing the magazine insertion slot opening/closing device of FIG. 1 in the closed state.
Figure 7:
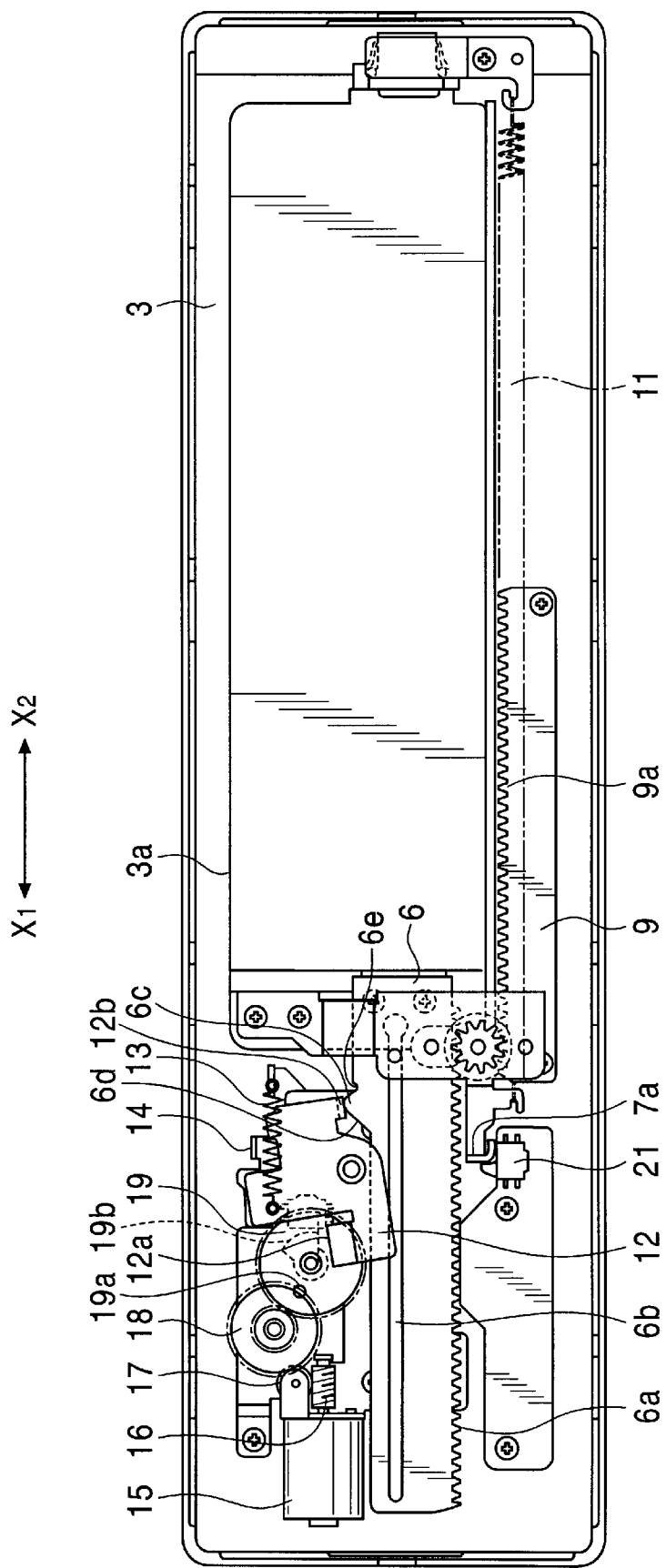
FIG. 7 is a rear view showing the magazine insertion slot opening/closing device of FIG. 1 in the state halfway the opening operation.

FIGS. 6 to 8 are rear views showing the magazine insertion slot opening/closing device according to the first embodiment; FIG. 6 shows the closed state, FIG. 7 shows the state halfway the opening operation, and FIG. 8 shows the open state. As shown in FIGS. 6 to 8, the second door plate 7 is urged by a door spring (door urging means) 11 in the direction $X_2$. Accordingly, the inner door 5 attached to the second door plate 7 is also urged in the direction $X_2$. In addition, the first door plate 6 coupled to the second door plate 7 through the gear damper 8 and the outer door 4 attached to the first door plate 6 are also urged in the direction $X_2$. Thus, the doors 4, 5 are urged by the door spring 11 in the direction to close the magazine insertion slot 3a of the decorative panel 3.

A lock mechanism for locking the doors 4, 5 in the open state comprises, as shown in FIGS. 4 and 6, a locking link (locking member) 12, a lock spring (lock urging means) 13, a stopper 14, etc. More specifically, the locking link 12 for locking the first door plate 6 is rotatably attached to the decorative panel 3 and is urged by the lock spring 13 in the locking direction, i.e., in the clockwise direction as viewed in the drawing, while the position of the locking link 12 is restricted by the stopper 14. The locking link 12 is provided with a pressed portion 12a and a bent portion 12b which comes into engagement with the projection 6c of the first door plate 6. Incidentally, $P_{41}$ denotes a lock-spring attachment point of the stopper 14.

The positional relationship between the locking link 12 of the lock mechanism and the projection 6c of the first door plate 6 will be described in more detail. As shown in FIG. 6, the projection 6c of the first door plate 6 has slopes 6d, 6e on both sides thereof. With the projection 6c having such a shape, when the first door plate 6 is moved from the closed position in the opening direction, i.e., to the left in the drawing, the slope 6d of the projection 6c on the guide side, i.e., on the left side in the drawing, pushes back the locking link 12 in the unlocking direction, i.e., in the counterclockwise direction as viewed in the drawing. Also, when an external force acting in the closing direction, i.e., to the right in the drawing, is applied to the first door plate 6 in the open position, the slope 6e of the projection 6c on the locked side, i.e., on the right side in the drawing, similarly pushes back the locking link 12 in the unlocking direction, i.e., in the counterclockwise direction as viewed in the drawing. In this connection, when the locked-side slope 6e of the projection 6c on the right side in the drawing is engaged with the locking link 12, there occurs a force tending to push back the locking link 12 in the unlocking direction due to the urging force of the door spring 11. However, the urging force of the lock spring 13 is set to be sufficiently greater than the force tending to push back the locking link 12.

On the other hand, an unlock mechanism for releasing the doors from the state locked by the above-described lock mechanism comprises, as shown in FIGS. 4 and 6, a motor (driving force supply means) 15, a worm gear 16 associated with the motor 15, gears 17, 18, a cam gear (release member) 19, etc. More specifically, the gears 17, 18 and the cam gear 19 are meshed in succession for coupling to the worm gear 16 associated with the motor 15. The motor 15 is rotated only in such a direction that the cam gear 19 is allowed to rotate in the clockwise direction as viewed in the drawing. The cam gear 19 is arranged on the front side of the locking link 12. A lug 19a is projected on a rear surface of the cam gear 19. With rotation of the cam gear 19, the lug 19a pushes the pressed portion 12a of the locking link 12 to retract from the lock position. A rotation sensor switch 20 is arranged on a front surface of the cam gear 19 and detects rotation of the cam gear 19 upon operation of a cam 19b disposed on the front surface of the cam gear 19.

Further, as shown in FIGS. 4 and 6, an opening sensor switch 21 for detecting the open state of the doors 4, 5 is provided on the decorative panel 3 in a position below the lock mechanism and the unlock mechanism. $P_{51}$ and $P_{52}$ in FIG. 4 denote attachment points of an opening sensor switchboard. As shown in FIGS. 7 and 8, when the doors 4, 5 are opened, the opening sensor switch 21 is pressed by the bent portion 7a of the second door plate 7, thereby detecting the fact that the doors 4, 5 are in the open state.

[2. Operation]

The thus-constructed magazine insertion slot opening/closing device of this embodiment operates as follows.

[2-1. Opening Operation]

First, when the magazine insertion slot 3a of the decorative panel 3 is opened prior to insertion or ejection of a magazine, the outer door 4 is moved in the direction $X_1$ from the closed state shown in FIG. 6. The first door plate 6 is also moved in the direction $X_1$ together with the outer door 4, causing the gear damper 8 to rotate through the rack 6a in the clockwise direction as viewed in the drawing. Because the gear damper 8 meshes the rack 9a of the rack plate 9 as well, the inner door 5 is also moved in the direction X. through the second door plate 7 upon the counterclockwise rotation of the gear damper 8, whereby the magazine insertion slot 3a is opened.

Then, when the first door plate 6 reaches the vicinity of a stroke limit of movement in the direction $X_1$, as shown in FIG. 7, with the movement of the outer door 4 in the direction $X_1$, the guide-side slope 6d of the projection 6c of the first door plate 6 engages the bent portion 12b of the locking link 12 and pushes it upward. The locking link 12 is thereby rotated in the counterclockwise direction as viewed in the drawing. When the outer door 4 is further moved in the direction $X_1$ from the above state, the bent portion 12b of the locking link 12 rides over the projection 6c to be able to descend again, and is then returned to the original position under the action of the lock spring 13 and the stopper 14 (FIG. 8). In this state, the outer door 4 and the inner door 5 are locked by the locking link 12, so that these doors are held at predetermined open positions where then open the magazine insertion slot 3a against the urging force of the door spring 11, even when the force which drives the outer door 4 in the direction $X_1$ is removed.

In this state, the locked-side slope 6e of the projection 6c of the first door plate 6 is engaged with the bent portion 12b of the locking link 12. Therefore, when the force of moving the outer door 4 in the direction $X_1$ is released, a locking-link push-up force (i.e., a force tending to push back the locking link 12 in the unlocking direction) exerts on the locking link 12 to push it upward due to the urging force of the door spring 11. However, the urging force of the lock spring 13 is set such that a locking-link hold force acting to hold the locking link 12 in the predetermined locked position under the urging force of the lock spring 13 is sufficiently greater than the locking-link push-up force due to the urging force of the door spring 11. Accordingly, in the condition shown in FIG. 8, load balance is established and the doors can be maintained in the stable locked state.

Stated otherwise, since the first door plate 6 is held by the locking link 12 against the urging force of the door spring 11 as shown in FIG. 8, the outer door 4 and the inner door 5 are locked in the predetermined open position at which the magazine insertion slot 3a is opened.

Although not shown in the drawings, the surface indicated as being the slope 6e of the projection 6c may be upright instead of being sloped. In such a case, the end surface corresponding to the slope 6e of the projection 6c engages with the end surface of the bent portion 12b of the locking link that faces in the direction X1. The urging force produced by the door spring 11 therefore acts to keep the end surface 6e of the projection 6c and the above-mentioned end surface in abutment with each other.

Also, in the locked state shown in FIG. 8, the opening sensor switch 21 provided on the decorative panel 3 is pressed by the bent portion 7a of the second door plate 7, thereby detecting the fact that the doors 4, 5 have reached in the predetermined open state. Where the magazine is inserted in the autochanger unit, an opening detection signal outputted from the opening sensor switch 21 can be utilized to start the ejection of the magazine.

Further, as mentioned above, the stroke $L_2$ through which the inner door 5 is movable is set to ½ of the stroke $L_1$ through which the outer door 4 is movable. Therefore, when the outer door 4 is moved to the predetermined open state as shown in FIG. 3B, the inner door 5 is brought into the state completely overlapping with the outer door 4 while being positioned on the inner side.

[2-2. Closing Operation by Manual Unlocking]

After the magazine insertion slot 3a of the decorative panel 3 has been opened with the opening operation described above, the doors 4, 5 can be easily released from the locked state to close the magazine insertion slot 3a of the decorative panel 3 by manually moving the outer door 4 in the direction $X_2$ to some extent.

More specifically, in the condition where the doors 4, 5 are locked in the predetermined open position, as described above, the locking-link push-up force due to the urging force of the door spring 11 exerts on the locked-side slope 6e of the projection 6c of the first door plate 6, but load balance is established because the locking-link hold force due to the urging force of the lock spring 13 is set to be sufficiently greater than the locking-link push-up force. By manually applying a force acting to move the outer door 4 in the direction $X_2$ in such a condition, the locking-link push-up force is increased by the manually applied moving force. Then, at the time the locking-link push-up force resulting from both the urging force of the door spring 11 and the manually applied moving force in the direction $X_2$ exceeds the locking-link hold force due to the urging force of the lock spring 13, the locking link 12 is rotated counterclockwise in FIG. 8 to release the first door plate 6 from the locked state.

As a result of the above manual unlocking, the outer door 4 and the inner door 5 are unlocked from the locking link 12 and moved in the direction $X_2$ under the urging force of the door spring 11, thereby closing the magazine insertion slot 3a. In other words, as shown in FIG. 3A, the outer door 4 and the inner door 5 are positioned side by side in the sliding direction to completely cover the magazine insertion slot 3a.

[2-3. Closing Operation by Automatic Unlocking after Insertion of Magazine]

When a magazine is inserted in the autochanger unit after making the magazine insertion slot 3a of the decorative panel 3 open with the above-described opening operation, the magazine is locked in a predetermined setup position and the magazine locked state is detected by a magazine-lock sensor switch (not shown) which is usually provided in the autochanger unit. By rotating the motor 15 from the state of FIG. 8 with a detection signal outputted from the magazine-lock sensor switch, the cam gear 19 is rotated in the counterclockwise direction as viewed in the drawing. Then, the lug 19a of the cam gear 19 pushes the pressed portion 12a of the locking link 12, whereupon the locking link 12 is rotated in the counterclockwise direction as viewed in the drawing to release the first door plate 6 from the locked state.

As a result of the above automatic unlocking, the outer door 4 and the inner door 5 are unlocked from the locking link 12 and moved in the direction $X_2$ under the urging force of the door spring 11, thereby closing the magazine insertion slot 3a. In other words, as shown in FIG. 3A, the outer door 4 and the inner door 5 are positioned side by side in the sliding direction to completely cover the magazine insertion slot 3a.

[2-4. Closing Operation by Automatic Unlocking without Insertion of Magazine]

After making the magazine insertion slot 3a of the decorative panel 3 open, when no magazine is inserted in the autochanger unit or when the closing operation by the manual unlocking is not performed, the opening sensor switch 21 detects the fact that the doors are open, and the magazine-lock sensor switch (not shown) in the autochanger unit does not detect the magazine locked state. In this case, by combining those switches with a timer and making control to rotate the motor 15 after a predetermined time has lapsed, it is possible to automatically close the doors 4, 5 as with the closing operation after insertion of the magazine.

[2-5. Closing Operation by Automatic Unlocking after Ejection of Magazine]

Figure 9A:
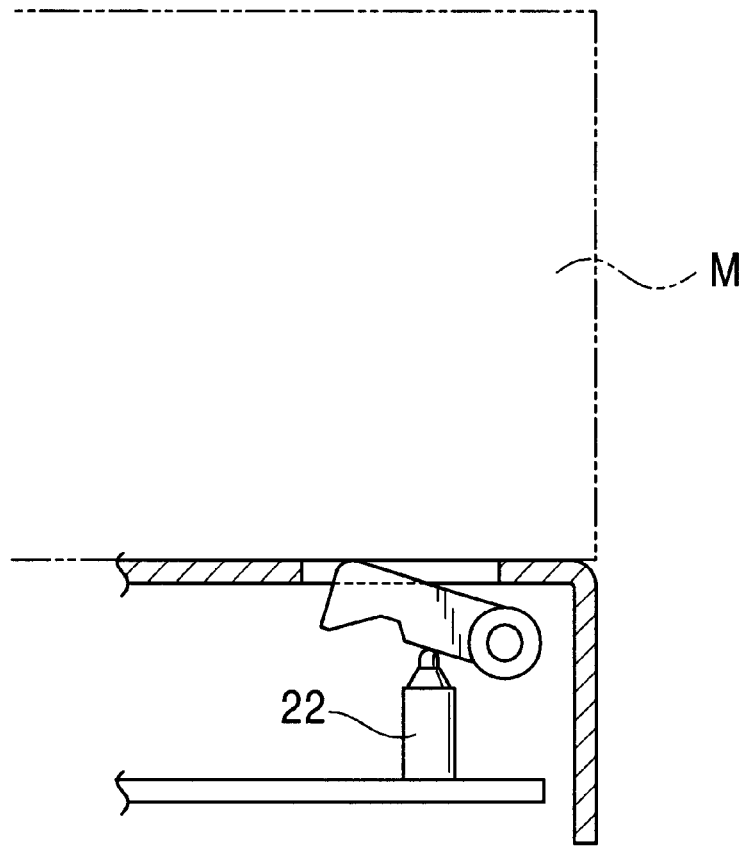
FIGS. 9A and 9B are sectional views for explaining the operation of a magazine IN/OUT detection switch 22 used in the magazine insertion slot opening/closing device of FIG. 1, FIG. 9A showing the magazine IN-state and FIG. 9B showing the magazine OUT-state.
Figure 9B:
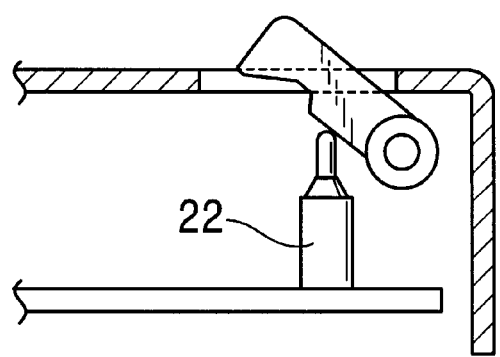

When the outer door 4 is opened in the condition of the magazine being loaded in the autochanger unit and then moved to the predetermined open position as shown in FIGS. 3B and 8, the opening sensor switch 21 detects the fact that the doors are open, and the magazine is ejected to reach a take-out position where the magazine slightly projects out of the magazine insertion slot 3a. Then, as shown in FIG. 9, when the magazine denoted by M is withdrawn to the outside, a magazine IN/OUT detection switch 22, which is usually provided in the autochanger unit, is changed over from the magazine IN-state shown in FIG. 9A to the magazine OUT-state shown in FIG. 9B. By rotating the motor 15 from the state of FIG. 8 with a detection signal outputted upon such a changeover, it is possible to automatically close the doors 4, 5 as with the closing operation after insertion of the magazine.

[3. Advantages]

With this embodiment, as described above, when a magazine is inserted in and ejected from the autochanger unit, the doors 4, 5 can be locked to the predetermined open position by the lock mechanism comprising the locking link 12, etc. after the doors 4, 5 have been opened. Therefore, the operation of inserting and ejecting the magazine can be performed in a satisfactory manner. Also, at the time the insertion or ejection of the magazine is completed, or when no magazine is inserted after the doors 4, 5 have been opened, it is possible to unlock the doors 4, 5 by rotating the motor 15 with the detection signals outputted from the various sensor switches, and to automatically close the doors 4, 5 with certainty under the urging force of the door spring 11. Further, just by simply moving the outer door 4 to some extent after the doors 4, 5 have been opened, the doors 4, 5 can be manually released from the locked state. In this case, it is also possible to automatically close the doors 4, 5 with certainty under the urging force of the door spring 11.

Stated otherwise, the door spring 11 exerts an urging force in the direction to normally bring the doors 4, 5 into the closed state. Therefore, even if the lock mechanism is failed, the doors 4, 5 can be automatically closed with certainty under the urging force of the door spring 11. As a result, the doors 4, 5 can be surely avoided from being undesirably left open, and foreign matters can be effectively prevented from entering the autochanger unit undesirably. In this embodiment, particularly, since the operation of closing the doors 4, 5 can also be effected by the manual unlocking, the doors 4, 5 can be operated in a flexible manner such as closing the doors 4, 5 immediately after the doors 4, 5 have been opened. For example, when the insertion or ejection of the magazine is ceased after opening the doors 4, 5, a time during which the doors 4, 5 are left open can be minimized by immediately closing the doors 4, 5 by the manual unlocking. On the other hand, even if any impact is applied in the closed state, the doors 4, 5 can be held in the predetermined closed position under the urging force of the door spring 11, and there is no risk that the doors 4, 5 may be opened undesirably.

Further, with this embodiment, a slide door comprises the outer door 4 and the inner door 5 which are interlocked through the gear damper 8, and the stroke through which the inner door 5 is movable is set to ½ of the stroke through which the outer door 4 is movable. In the closed state, therefore, the doors 4, 5 can be located in overlapped relation to occupy a compact space. Accordingly, a space necessary for operating the whole of the slide door can be made as small as possible, i.e., much smaller than the case of constructing the slide door by a single member, and the slide door is avoided from projecting out of the decorative panel 3 undesirably when it is opened. This point is effective not only in saving the necessary space, but also in improving reliability because more possible damage of the projected slide door can be avoided.

(B) Second Embodiment

[1. Construction]

Figure 11:
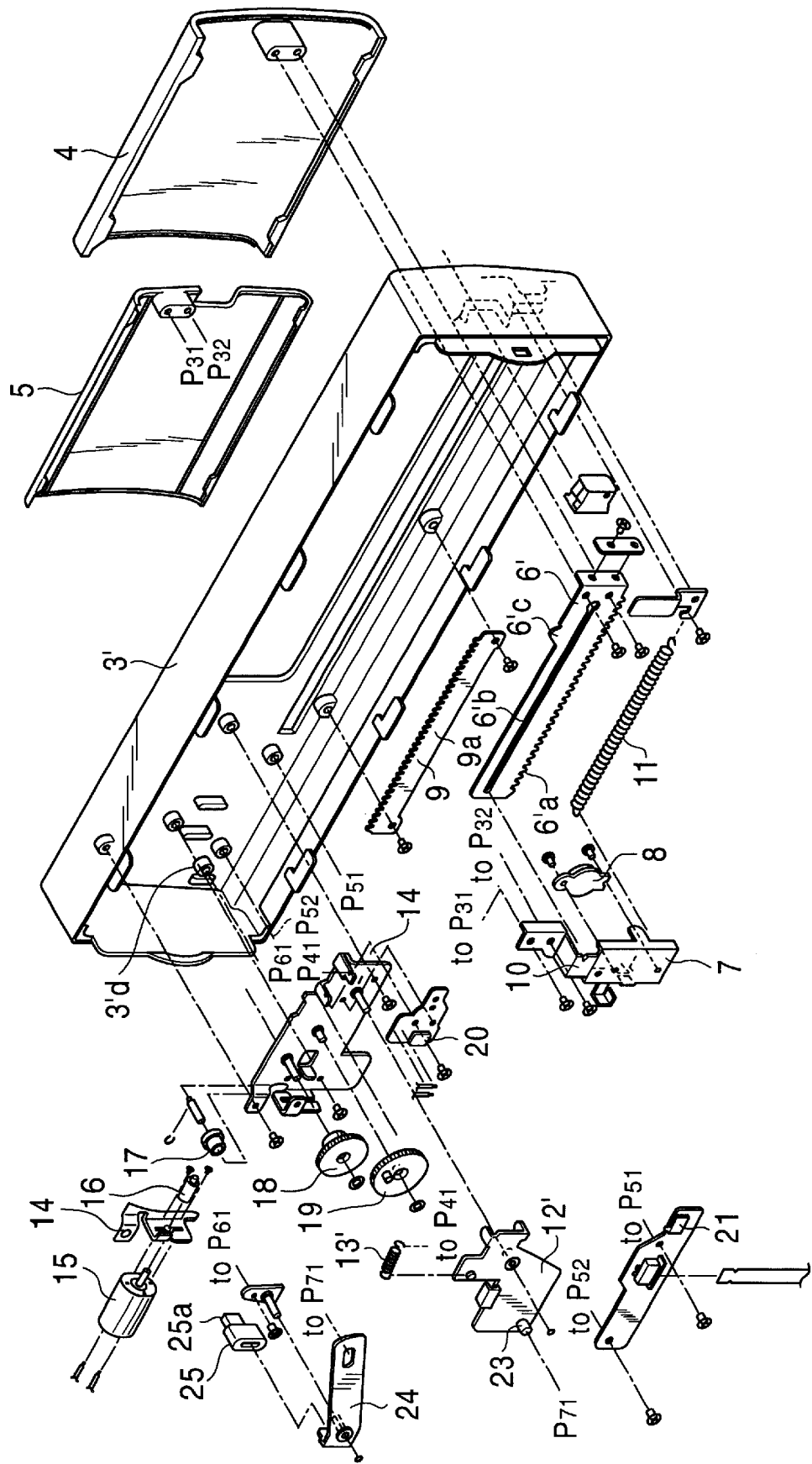
FIG. 11 is an exploded perspective view of the magazine insertion slot opening/closing device of FIG. 10 as viewed from thy rear side.
Figure 12:
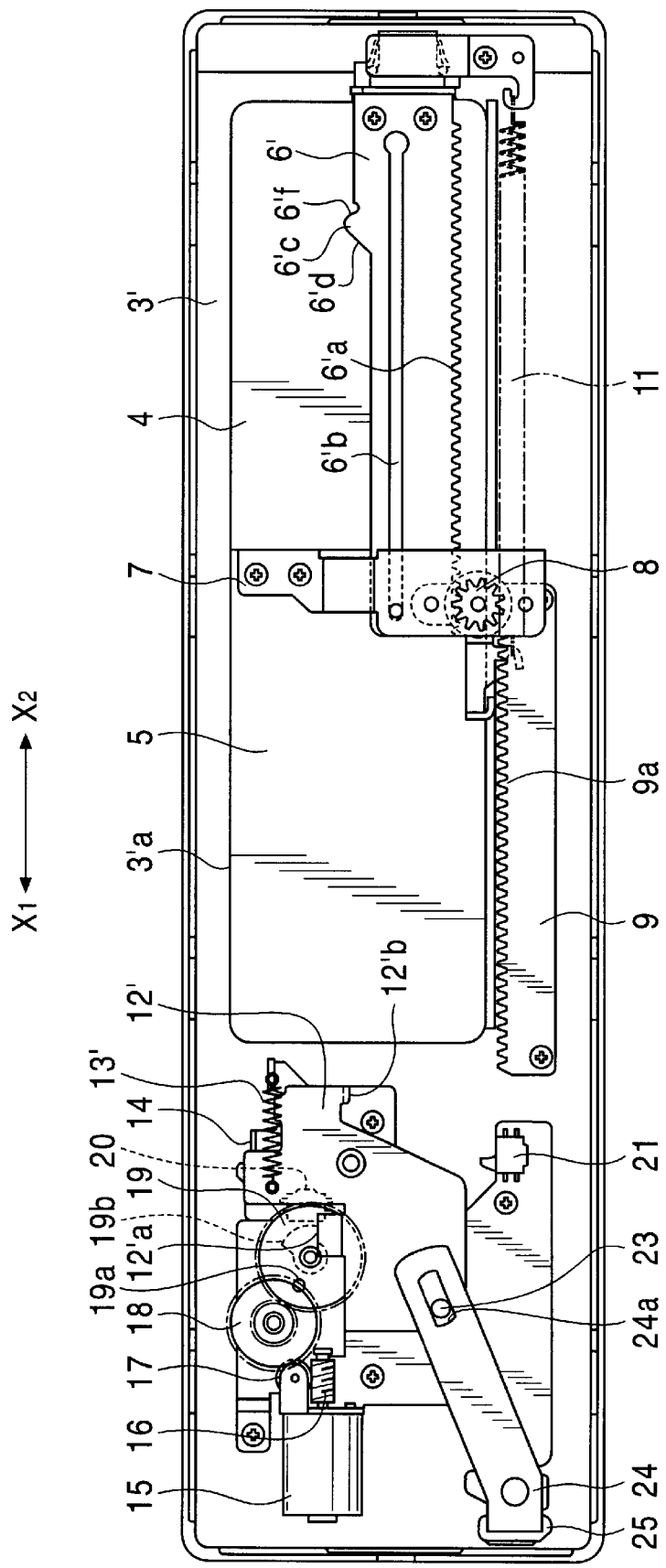
FIG. 12 is a rear view showing the magazine insertion slot opening/closing device of FIG. 10 in the closed state.
Figure 13:
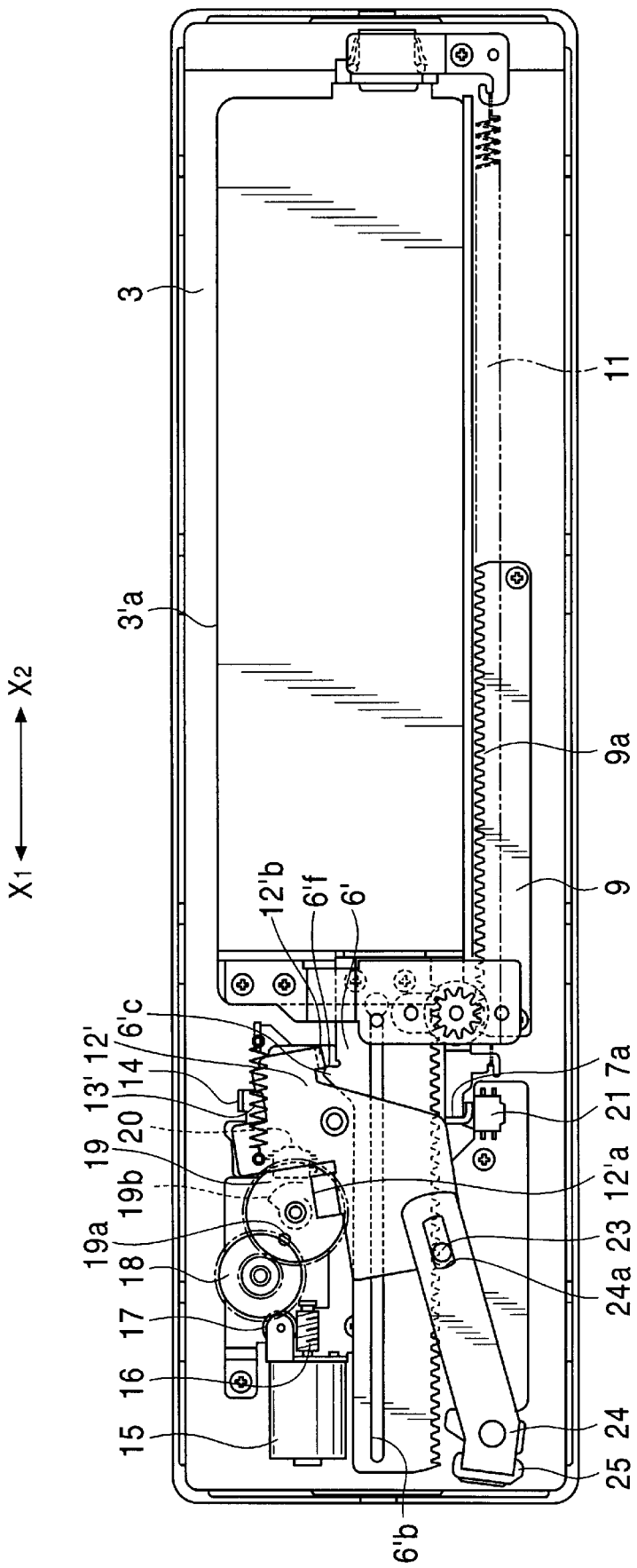
FIG. 13 is a rear view showing the magazine insertion slot opening/closing device of FIG. 10 in the state halfway the opening operation.
Figure 14:
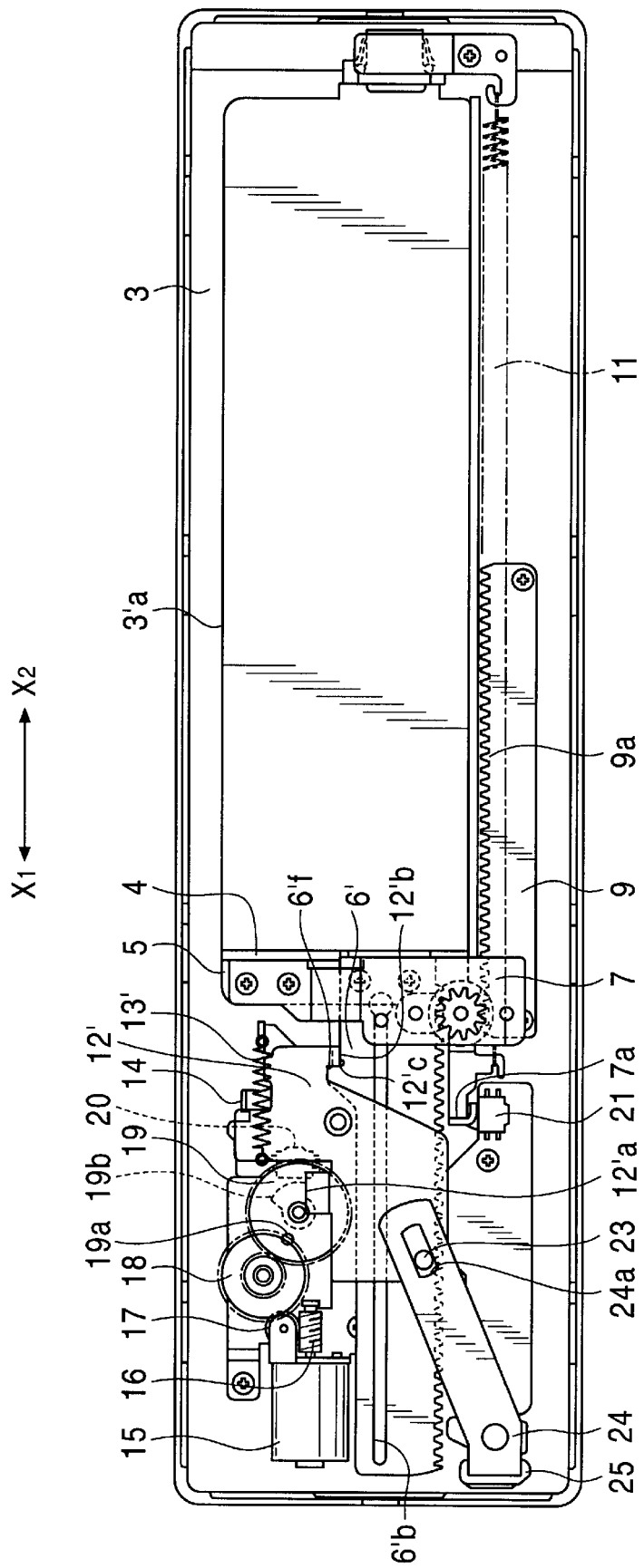
FIG. 14 is a rear view showing the magazine insertion slot opening/closing device of FIG. 10 in the open state.

FIGS. 10A and 10B are front views showing a decorative panel 3', an outer door 4 and an inner door 5 in a magazine insertion slot opening/closing device according to a second embodiment of the present invention, and FIG. 11 is an exploded perspective view of the magazine insertion slot opening/closing device as viewed from the rear side. FIGS. 12–14 are rear views showing the magazine insertion slot opening/closing device according to the second embodiment; FIG. 12 shows the closed state, FIG. 13 shows the state halfway the opening operation, and FIG. 14 shows the open state. Note that since most parts of the device according to the second embodiment are the same as those of the device according to the first embodiment, features of the second embodiment different from those of the first embodiment will be primarily described below and the same components as those in the first embodiment are not described here.

First, as shown in FIG. 10, a hole 3'd is formed in this embodiment at one end of the decorative panel 3' in a position that is not covered by the doors 4, 5 but exposed when the doors 4, 5 are located in overlapped relation on the outer and inner sides to make open a magazine insertion slot 3'a.

Then, as shown in FIGS. 12 to 14, a locking link 12' rotatably attached to the decorative panel 3' is formed in this embodiment as a larger member obtained by extending one end of the locking link 12 in the first embodiment, and a release pin 23 is provided at an extended end of the locking link 12'. A release link (manual release member) 24 is arranged in overlapped relation to the extended end of the locking link 12' and is rotatably attached to the decorative panel 3'. The release pin 23 projecting on the locking link 12' is fitted to an elongate hole 24a formed in one end (engaging end) of the release link 24. Here, the locking link 12' is urged by a lock spring 13' in the locking direction, i.e., in the clockwise direction as viewed in the drawing, while the position of the locking link 12' is restricted by a stopper 14. Therefore, the position of the release link 24 is also restricted to the state shown in FIG. 12 through the release pin 23 projecting on the locking link 12'. Incidentally, $P_{61}$, in FIG. 11 denotes a release-link attachment point of the decorative panel 3', and $P_{71}$, denotes a release-link attachment point (pin 23) of the locking link 12'.

Further, an externally operated release block 25 is attached to the other end (operated end) of the release link 24. As shown in FIG. 10, a fore end 25a of the release block 25 is projected out of the surface of the decorative panel 3' through the hole 3'd formed therein so that the fore end 25a is movable in the direction of arrow indicated in FIG. 10, i.e., upward in the drawing.

Moreover, in this embodiment, a projection 6'c of a first door plate 6' has a slope formed only in one side thereof. More specifically, when the first door plate 6' is moved from the closed position in the opening direction, i.e., to the left in the drawing, the slope 6'd of the projection 6'c on the guide side, i.e., on the left side in the drawing, pushes back the locking link 12' in the unlocking direction, i.e., in the counterclockwise direction as viewed in the drawing. On the other hand, when the first door plate 6' reaches the open position, an end surface 6'f of the projection 6'c on the locked side, i.e., on the right side in the drawing, is engaged with an end surface 12'c of a bent portion 12'b of the locking link 12', the urging force of the door spring 11 provides a force not tending to push back the locking link 12' in the unlocking direction, but tending to abut the end surfaces 6'f, 12'c with each other and retain the locked state. In this second embodiment, therefore, the urging force of the lock spring 13' is set to be smaller than that of the lock spring 13 in the above first embodiment.

[2. Operation]

Of the operation of the thus-constructed magazine insertion slot opening/closing device of this second embodiment, the closing operation by automatic unlocking when the magazine is inserted or not inserted and when the magazine is ejected, is exactly same as in the above first embodiment, and hence is not described here. The following description is made only of the opening operation and the closing operation by manual unlocking.

[2-1. Opening Operation]

First, when opening the magazine insertion slot 3'a of the decorative panel 3', the outer door 4 is moved in the direction $X_1$ from the closed state shown in FIG. 12. Then, when the first door plate 6' reaches the vicinity of a stroke limit of movement in the direction $X_1$, as shown in FIG. 13, with the movement of the outer door 4 in the direction $X_1$, the guide-side slope 6'd of the projection 6'c of the first door plate 6' engages the bent portion 12'b of the locking link 12' and pushes it upward. The locking link 12' is thereby rotated in the counterclockwise direction as viewed in the drawing. When the outer door 4 is further moved in the direction $X_1$ from the above state, the bent portion 12'b of the locking link 12' rides over the projection 6'c to be able to descend again, and is then returned to the original position under the action of the lock spring 13 and the stopper 14 (FIG. 14).

In this state, the outer door 4 and the inner door 5 are locked by the locking link 12' and are held in the predetermined open position, at which the magazine insertion slot 3'a is open, regardless of the urging force of the door spring 11 even after the force of moving the outer door 4 in the direction $X_1$ is released. More specifically, as shown in FIG. 14, the locked-side end surface 6'f of the projection 6'c of the first door plate 6' is engaged with the bent portion 12'b of the locking link 12' such that the urging force of the door spring 11 acts to make both the end surfaces 6'f and 12'c abutted with each other.

[2-2. Closing Operation by Manual Unlocking]

After the magazine insertion slot 3'a of the decorative panel 3' has been opened with the opening operation described above, the doors 4, 5 can be easily released from the locked state to close the magazine insertion slot 3'a of the decorative panel 3' by manually moving the fore end 25a of the release block 25 to some extent in the direction of arrow as shown in FIG. 10B.

More specifically, when the fore end 25a of the release block 25 is slightly moved in the direction of arrow (FIG. 10B), the release link 24 is rotated clockwise in the drawing as shown in FIG. 13. With the clockwise direction of the release link 24, an edge surface of the elongate hole 24a of the release link 24 pushes the pin 23 projecting on the locking link 12' to rotate the locking link 12' in the counterclockwise direction as viewed in the drawing, whereby the first door plate 6' is released from the locked state.

As a result of the above manual unlocking, the outer door 4 and the inner door 5 are released from the locking link 12 and moved in the direction $X_2$ under the urging force of the door spring 11, thereby closing the magazine insertion slot 3a. In other words, as shown in FIG. 10A, the outer door 4 and the inner door 5 are positioned side by side in the sliding direction to completely cover the magazine insertion slot 3a.

[3. Advantages]

With this embodiment, as described above, when a magazine is inserted in and ejected from the autochanger unit, the doors 4, 5 can be locked to the predetermined open position, as with the above first embodiment, by the lock mechanism comprising the locking link 12', etc. after the doors 4, 5 have been opened. Therefore, the operation of inserting and ejecting the magazine can be performed in a satisfactory manner. Also, at the time the insertion or ejection of the magazine is completed, or when no magazine is inserted after the doors 4, 5 have been opened, it is possible, as with the above first embodiment, to unlock the doors 4, 5 by rotating the motor 15 with the detection signals outputted from various sensor switches, and to automatically close the doors 4, 5 with certainty under the urging force of the door spring 11. Further, just by simply moving the release link 24 to some extent after the doors 4, 5 have been opened, the doors 4, 5 can be manually released from the locked state. In this case, it is also possible to automatically close the doors 4, 5 with certainty under the urging force of the door spring Accordingly, this second embodiment can provide similar advantages as obtainable with the above first embodiment.

(C) Other Embodiments

The present invention is not limited to the above-described embodiments, but includes a variety of other embodiments. Detailed constructions of the components, such as the slide door, the urging means, the lock mechanism, the unlock mechanism, and the manual unlocking means, can be modified as needed. For example, in the above first embodiment, the projection having the guide-side slope and the locked-side slope is provided on the side of the slide door, as an engagement portion provided on one of the slide door and the locking member to locate therebetween, and the bent portion of the locking member is urged to engage the projection. On the contrary, however, a projection and a recess may be provided on the side of the locking member to form a guide-side slope and a locked-side slope. Further, detailed construction and arrangement of the manual release member are selectable case by case.

The slide door may be divided into three or more parts in the sliding direction. Conversely, a single slide door not divided into plural parts may also be used. Further, detailed construction of various detecting means, such as the opening sensor switch, and detailed construction of control circuits including the various detecting means are selectable case by case.

Moreover, since the present invention is concerned with the construction of a device for opening and closing a magazine insertion slot, detailed scheme and construction of autochangers to which the present invention is applied are limited in no way. In other words, the present invention is applicable to various autochangers so long as they are of the magazine type having the magazine insertion slot through which a magazine is inserted and ejected. In any case, the superior advantages as described above can be obtained.

According to the magazine insertion slot opening/closing device of the present invention, as described above, the device comprises door urging means for urging a slide door in the closing direction, a lock mechanism for locking the slide door in the open state, and an unlock mechanism and manual unlocking means for releasing the slide door locked by the lock mechanism. Therefore, when the magazine is inserted and ejected, the operation of inserting and ejecting the magazine can be performed in a satisfactory manner with the slide door locked in the open state. Also, at the time the insertion or ejection of the magazine is completed, the slide door can be automatically closed with certainty.

Stated otherwise, the slide door can be locked in the open state when required, whereas the slide door can be reliably closed after being opened and can be held in the closed state with stability. Accordingly, the slide door is avoided from being left open, and a possibility of foreign matters entering an autochanger unit can be reduced to a very low level. Since the operation of closing the slide door can also be effected by manual unlocking, the slide door can be opened and closed in a more flexible manner. In addition, it is possible to further shorten the time during which the slide door is left open.

It is to be understood, however, the provision of the manual unlocking feature is not essential in the present invention. Namely, the magazine insertion slot opening/closing device of the present invention produces its peculiar advantages as described before, even when it is devoid of the manual unlock unit. Other changes and modifications are still possible within the scope of the present invention which is limited solely by the appended claims.

What is claimed is:

1. A magazine insertion slot opening/closing device for opening and closing a magazine insertion slot provided in a magazine type changer unit, said device comprising:

a slide door slidably supported by a body of said changer unit to open and close said magazine insertion slot;

door urging means for urging said slide door in a closing direction;

a lock mechanism for locking said slide door in an open state wherein said lock mechanism includes a locking member for locking said slide door and lock urging means for urging said locking member in a locking direction, said locking member being first pushed back in an unlocking direction with movement of said slide door in an opening direction and then moved in the locking direction to lock said slide door with further movement of said slide door in the opening direction; and an unlock mechanism for releasing said slide door locked by said lock mechanism, wherein said unlock mechanism includes a release member for driving said locking member in the unlocking direction and driving force supply means for applying a driving force to said release member, said driving force supply means applying the driving force to said release member for causing said release member to release said slide door locked by said lock mechanism and said unlock mechanism releases said slide door locked by said lock mechanism when a magazine is ejected from the body of said autochanger unit and withdrawn to the outside through said magazine insertion slot.

2. A magazine insertion slot opening/closing device according to claim 1, wherein said slide door comprises a plurality of slide doors which are divided in a sliding direction and slidable along respective inner and outer paths, and interlock means is provided between adjacent two of the divided slide doors for jointly moving the adjacent slide doors.

3. A magazine insertion slot opening/closing device for opening and closing a magazine insertion slot provided in a magazine type changer unit, said device comprising:

a slide door slidably supported by a body of said changer unit to open and close said magazine insertion slot;

door urging means for urging said slide door in a closing direction;

a lock mechanism for locking said slide door in an open state; and an unlock mechanism for releasing said slide door locked by said lock mechanism, wherein said slide door comprises a plurality of slide doors which are divided in a sliding direction and slidable along respective inner and outer paths, and interlock means is provided between adjacent two of the divided slide doors for jointly moving the adjacent slide doors.

4. A magazine insertion slot opening/closing device for opening and closing a magazine insertion slot provided in a magazine type changer unit, said device comprising:

a slide door slidably supported by a body of said changer unit to open and close said magazine insertion slot;

door urging means for urging said slide door in a closing direction;

a lock mechanism for locking said slide door in an open state wherein said lock mechanism includes a locking member for locking said slide door and lock urging means for urging said locking member in a locking direction, said locking member being first pushed back in an unlocking direction with movement of said slide door in an opening direction and then moved in the locking direction to lock said slide door with further movement of said slide door in the opening direction; and an unlock mechanism for releasing said slide door locked by said lock mechanism, wherein said unlock mechanism includes a release member for driving said locking member in the unlocking direction and driving force supply means for applying a driving force to said release member, said driving force supply means applying the driving force to said release member for causing said release member to release said slide door locked by said lock mechanism and said unlock mechanism releases said slide door locked by said lock mechanism when a predetermined time period has lapsed after opening of said slide door in a condition where no magazine is inserted in the body of said autochanger unit.

5. A magazine insertion slot opening/closing device according to claim 4, wherein said slide door comprises a plurality of slide doors which are divided in a sliding direction and slidable along respective inner and outer paths, and interlock means is provided between adjacent two of the divided slide doors for jointly moving the adjacent slide doors.

6. A magazine insertion slot opening/closing device according to claim 4, wherein said unlock mechanism releases said slide door locked by said lock mechanism when a magazine is ejected from the body of said autochanger unit and withdrawing to the outside through said magazine insertion slot.

7. A magazine insertion slot opening/closing device for discs comprising:
   a bifurcated door having a slidable first door portion and a second door portion;
   a biasing member for biasing the bifurcated door to a closed position;
   a locking mechanism for locking the bifurcated door in an open position against the force of the biasing member;
   a first sensor for detecting a predetermined open state of the bifurcated door; and
   a control unit including a timer for determining when the first sensor has detected the opening of the bifurcated door and after a predetermined time controlling the locking mechanism to release the bifurcated door to permit the biasing member to close the bifurcated door.

8. A magazine insertion slot opening/closing device for opening and closing a magazine insertion slot provided in a magazine type changer unit, said device comprising:
   a slide door slidably supported by a body of said changer unit to open and close said magazine insertion slot;
   door urging means for urging said slide door in a closing direction;
   a lock mechanism for locking said slide door in an open state, wherein said lock mechanism includes a locking member for locking said slide door and lock urging means for urging said locking member in a locking direction, said locking member being first pushed back in an unlocking direction with movement of said slide door in an opening direction and then moved in the locking direction to lock said slide door with further movement of said slide door in the opening direction;
   an unlock mechanism for releasing said slide door locked by said lock mechanism, wherein said unlock mechanism includes a release member for driving said locking member in the unlocking direction and driving force supply means for applying a driving force to said release member, said driving force supply means applying the driving force to said release member for causing said release member to release said slide door locked by said lock mechanism; and
   manual unlocking means capable of manually releasing said slide door locked by said lock mechanism separately from said unlock mechanism, wherein said manual unlocking means generates a force of pushing back said locking member in the unlocking direction when an external force greater than a predetermined force is applied.

9. A magazine insertion slot opening/closing device according to claim 8, wherein said manual unlocking means is constructed by an engagement portion provided on one of said slide door and said locking member to locate therebetween, said engagement portion generating the force of pushing back said locking member in the unlocking direction when an external force greater than a predetermined force is applied to said slide door in the closing direction.

10. A magazine insertion slot opening/closing device according to claim 8, wherein said engagement portion includes a guide-side slope and a locked-side slope which are sloped in different directions,
   said guide-side slope acting to generate a force of pushing back said locking member in the unlocking direction upon application of a force of moving said slide door in the opening direction,
   said locked-side slope acting to generate a force of pushing back said locking member in the unlocking direction upon application of a force of moving said slide door in the closing direction,
   said lock urging means generating a urging force set such that a force acting to hold said locking member in a predetermined lock position under the urging force generated by said lock urging means is greater than a force acting to push back said locking member in the unlocking direction under the urging force generated by said door urging means.

11. A magazine insertion slot opening/closing device for opening and closing a magazine insertion slot provided in a magazine type changer unit, said device comprising:
   a slide door slidably supported by a body of said changer unit to open and close said magazine insertion slot;
   door urging means for urging said slide door in a closing direction;
   a lock mechanism for locking said slide door in an open state wherein said lock mechanism includes a locking member for locking said slide door and lock urging means for urging said locking member in a locking direction, said locking member being first pushed back in an unlocking direction with movement of said slide door in an opening direction and then moved in the locking direction to lock said slide door with further movement of said slide door in the opening direction; and
   an unlock mechanism for releasing said slide door locked by said lock mechanism, wherein said unlock mechanism includes a release member for driving said locking member in the unlocking direction and driving force supply means for applying a driving force to said release member, said driving force supply means applying the driving force to said release member for causing said release member to release said slide door locked by said lock mechanism and said unlock mechanism releases said slide door locked by said lock mechanism when a magazine is inserted into the body of said autochanger unit and locked in a predetermined setup position.

12. A magazine insertion slot opening/closing device according to claim 11, wherein said unlock mechanism releases said slide door locked by said lock mechanism when a predetermined time period has lapsed after opening of said slide door in a condition where no magazine is inserted in the body of said autochanger unit.

13. A magazine insertion slot opening/closing device according to claim 11, wherein said unlock mechanism releases said slide door locked by said lock mechanism when a magazine is ejected from the body of said autochanger unit and withdrawing to the outside through said magazine insertion slot.

14. A magazine insertion slot opening/closing device according to claim 11, wherein said slide door comprises a plurality of slide doors which are divided in a sliding direction and slidable along respective inner and outer paths, and interlock means is provided between adjacent two of the divided slide doors for jointly moving the adjacent slide doors.

* * * * *